(12) United States Patent
Bucknell

(10) Patent No.: US 10,926,599 B2
(45) Date of Patent: Feb. 23, 2021

(54) SUSPENSION SYSTEMS USING HYDRAULIC DAMPERS

(71) Applicant: DIVERGENT TECHNOLOGIES, INC., Los Angeles, CA (US)

(72) Inventor: John Russell Bucknell, El Segundo, CA (US)

(73) Assignee: DIVERGENT TECHNOLOGIES, INC., Los Angeles, CA (US)

( * ) Notice: Subject to any disclaimer, the term of this patent is extended or adjusted under 35 U.S.C. 154(b) by 0 days.

(21) Appl. No.: 15/829,845

(22) Filed: Dec. 1, 2017

(65) Prior Publication Data

US 2019/0168561 A1    Jun. 6, 2019

(51) Int. Cl.
| | |
|---|---|
| *B60G 17/016* | (2006.01) |
| *B60G 5/04* | (2006.01) |
| *B60G 11/26* | (2006.01) |
| *B60G 11/44* | (2006.01) |
| *B60G 13/08* | (2006.01) |

(Continued)

(52) U.S. Cl.
CPC .......... *B60G 17/0162* (2013.01); *B60G 5/04* (2013.01); *B60G 11/265* (2013.01); *B60G 11/44* (2013.01); *B60G 13/08* (2013.01); *B60G 17/0165* (2013.01); *B60G 21/005* (2013.01); *B60G 21/05* (2013.01); *B60G 21/067* (2013.01); *B60G 2202/11* (2013.01); *B60G 2202/24* (2013.01); *B60G 2300/124* (2013.01);

(Continued)

(58) Field of Classification Search
USPC .......................................................... 701/37
See application file for complete search history.

(56) References Cited

U.S. PATENT DOCUMENTS

| | | | |
|---|---|---|---|
| 4,463,515 A | * | 8/1984 | Barlow .................. A63H 29/20 446/409 |
| 4,652,010 A | | 3/1987 | Sugasawa |
| | | | (Continued) |

FOREIGN PATENT DOCUMENTS

| | | |
|---|---|---|
| CN | 103434364 A | 12/2013 |
| EP | 2540533 A3 * | 6/2012 |
| | (Continued) | |

OTHER PUBLICATIONS

US 9,202,136 B2, 12/2015, Schmidt et al. (withdrawn)

(Continued)

*Primary Examiner* — Jean Paul Cass
(74) *Attorney, Agent, or Firm* — Arent Fox LLP

(57) ABSTRACT

A dual-mode suspension system using hydraulic dampers is disclosed. One or more dampers on each side of the four-wheel suspension system are coupled to a respective damper on the other side via a damper valve. One or more leaf springs may be arranged between the leading links coupled to some of the dampers, and trailing links coupled to other of the dampers. The suspension system may advantageously engage, lock, or partially disengage the respective dampers connected by the valve on each side of the system. Manipulating the valve to control engagement of the dampers, which may depend on the speed and related issues, provides control over whether heave motions should be separated from roll. In another embodiment, one or more single or double acting hydraulic cylinders may be used to engage dampers.

16 Claims, 5 Drawing Sheets

(51) Int. Cl.
  *B60G 21/00* (2006.01)
  *B60G 17/0165* (2006.01)
  *B60G 21/05* (2006.01)
  *B60G 21/067* (2006.01)
(52) U.S. Cl.
  CPC ...... *B60G 2300/45* (2013.01); *B60G 2300/50* (2013.01); *B60G 2500/11* (2013.01)

(56) References Cited

U.S. PATENT DOCUMENTS

| | | | |
|---|---|---|---|
| 5,203,226 A | 4/1993 | Hongou et al. | |
| 5,231,583 A * | 7/1993 | Lizell | B60G 17/015 280/5.506 |
| 5,276,621 A * | 1/1994 | Henry | B60G 17/0157 280/5.52 |
| 5,294,146 A * | 3/1994 | Tabata | B60G 17/0162 280/5.508 |
| 5,328,004 A * | 7/1994 | Fannin | F16F 9/466 188/266.5 |
| 5,484,152 A * | 1/1996 | Nunes | B62K 3/005 280/264 |
| 5,591,107 A * | 1/1997 | Rodgers, Jr. | A63B 71/0622 482/51 |
| 5,742,385 A | 4/1998 | Champa | |
| 5,990,444 A | 11/1999 | Costin | |
| 6,010,155 A | 1/2000 | Rinehart | |
| 6,096,249 A | 8/2000 | Yamaguchi | |
| 6,140,602 A | 10/2000 | Costin | |
| 6,250,533 B1 | 6/2001 | Otterbein et al. | |
| 6,252,196 B1 | 6/2001 | Costin et al. | |
| 6,318,642 B1 | 11/2001 | Goenka et al. | |
| 6,365,057 B1 | 4/2002 | Whitehurst et al. | |
| 6,391,251 B1 | 5/2002 | Keicher et al. | |
| 6,409,930 B1 | 6/2002 | Whitehurst et al. | |
| 6,468,439 B1 | 10/2002 | Whitehurst et al. | |
| 6,554,345 B2 | 4/2003 | Jonsson | |
| 6,585,151 B1 | 7/2003 | Ghosh | |
| 6,644,721 B1 | 11/2003 | Miskech et al. | |
| 6,811,744 B2 | 11/2004 | Keicher et al. | |
| 6,866,497 B2 | 3/2005 | Saiki | |
| 6,919,035 B1 | 7/2005 | Clough | |
| 6,926,970 B2 | 8/2005 | James et al. | |
| 7,152,292 B2 | 12/2006 | Hohmann et al. | |
| 7,316,594 B2 * | 1/2008 | Longdill | B60G 3/24 440/12.5 |
| 7,344,186 B1 | 3/2008 | Hausler et al. | |
| 7,413,063 B1 * | 8/2008 | Davis | B60G 17/06 188/267.1 |
| 7,500,373 B2 | 3/2009 | Quell | |
| 7,586,062 B2 | 9/2009 | Heberer | |
| 7,637,134 B2 | 12/2009 | Burzlaff et al. | |
| 7,710,347 B2 | 5/2010 | Gentilman et al. | |
| 7,712,592 B2 * | 5/2010 | Jansen | F16D 7/022 192/41 S |
| 7,716,802 B2 | 5/2010 | Stern et al. | |
| 7,745,293 B2 | 6/2010 | Yamazaki et al. | |
| 7,766,123 B2 | 8/2010 | Sakurai et al. | |
| 7,852,388 B2 | 12/2010 | Shimizu et al. | |
| 7,908,922 B2 | 3/2011 | Zarabadi et al. | |
| 7,951,324 B2 | 5/2011 | Naruse et al. | |
| 8,094,036 B2 | 1/2012 | Heberer | |
| 8,163,077 B2 | 4/2012 | Eron et al. | |
| 8,286,236 B2 | 10/2012 | Jung et al. | |
| 8,289,352 B2 | 10/2012 | Vartanian et al. | |
| 8,297,096 B2 | 10/2012 | Mizumura et al. | |
| 8,354,170 B1 | 1/2013 | Henry et al. | |
| 8,383,028 B2 | 2/2013 | Lyons | |
| 8,408,036 B2 | 4/2013 | Reith et al. | |
| 8,429,754 B2 | 4/2013 | Jung et al. | |
| 8,437,513 B1 | 5/2013 | Derakhshani et al. | |
| 8,444,903 B2 | 5/2013 | Lyons et al. | |
| 8,452,073 B2 | 5/2013 | Taminger et al. | |
| 8,573,618 B2 | 11/2013 | Schroder | |
| 8,599,301 B2 | 12/2013 | Dowski, Jr. et al. | |
| 8,606,540 B2 | 12/2013 | Haisty et al. | |
| 8,610,761 B2 | 12/2013 | Haisty et al. | |
| 8,631,996 B2 | 1/2014 | Quell et al. | |
| 8,675,925 B2 | 3/2014 | Derakhshani et al. | |
| 8,678,060 B2 | 3/2014 | Dietz et al. | |
| 8,686,314 B2 | 4/2014 | Schneegans et al. | |
| 8,686,997 B2 | 4/2014 | Radet et al. | |
| 8,694,284 B2 | 4/2014 | Berard | |
| 8,720,876 B2 | 5/2014 | Reith et al. | |
| 8,752,166 B2 | 6/2014 | Jung et al. | |
| 8,755,923 B2 | 6/2014 | Farahani et al. | |
| 8,787,628 B1 | 7/2014 | Derakhshani et al. | |
| 8,818,771 B2 | 8/2014 | Gielis et al. | |
| 8,873,238 B2 | 10/2014 | Wilkins | |
| 8,978,535 B2 | 3/2015 | Ortiz et al. | |
| 9,006,605 B2 | 4/2015 | Schneegans et al. | |
| 9,071,436 B2 | 6/2015 | Jung et al. | |
| 9,101,979 B2 | 8/2015 | Hofmann et al. | |
| 9,104,921 B2 | 8/2015 | Derakhshani et al. | |
| 9,126,365 B1 | 9/2015 | Mark et al. | |
| 9,128,476 B2 | 9/2015 | Jung et al. | |
| 9,138,924 B2 | 9/2015 | Yen | |
| 9,149,988 B2 | 10/2015 | Mark et al. | |
| 9,156,205 B2 | 10/2015 | Mark et al. | |
| 9,186,848 B2 | 11/2015 | Mark et al. | |
| 9,244,986 B2 | 1/2016 | Karmarkar | |
| 9,248,611 B2 | 2/2016 | Divine et al. | |
| 9,254,535 B2 | 2/2016 | Buller et al. | |
| 9,266,566 B2 | 2/2016 | Kim | |
| 9,269,022 B2 | 2/2016 | Rhoads et al. | |
| 9,327,452 B2 | 5/2016 | Mark et al. | |
| 9,329,020 B1 | 5/2016 | Napoletano | |
| 9,332,251 B2 | 5/2016 | Haisty et al. | |
| 9,346,127 B2 | 5/2016 | Buller et al. | |
| 9,389,315 B2 | 7/2016 | Bruder et al. | |
| 9,399,256 B2 | 7/2016 | Buller et al. | |
| 9,403,235 B2 | 8/2016 | Buller et al. | |
| 9,418,193 B2 | 8/2016 | Dowski, Jr. et al. | |
| 9,457,514 B2 | 10/2016 | Schwärzler | |
| 9,469,057 B2 | 10/2016 | Johnson et al. | |
| 9,478,063 B2 | 10/2016 | Rhoads et al. | |
| 9,481,402 B1 | 11/2016 | Muto et al. | |
| 9,486,878 B2 | 11/2016 | Buller et al. | |
| 9,486,960 B2 | 11/2016 | Paschkewitz et al. | |
| 9,502,993 B2 | 11/2016 | Deng | |
| 9,525,262 B2 | 12/2016 | Stuart et al. | |
| 9,533,526 B1 | 1/2017 | Nevins | |
| 9,555,315 B2 | 1/2017 | Aders | |
| 9,555,580 B1 | 1/2017 | Dykstra et al. | |
| 9,557,856 B2 | 1/2017 | Send et al. | |
| 9,566,742 B2 | 2/2017 | Keating et al. | |
| 9,566,758 B2 | 2/2017 | Cheung et al. | |
| 9,573,193 B2 | 2/2017 | Buller et al. | |
| 9,573,225 B2 | 2/2017 | Buller et al. | |
| 9,586,290 B2 | 3/2017 | Buller et al. | |
| 9,595,795 B2 | 3/2017 | Lane et al. | |
| 9,597,843 B2 | 3/2017 | Stauffer et al. | |
| 9,600,929 B1 | 3/2017 | Young et al. | |
| 9,609,755 B2 | 3/2017 | Coull et al. | |
| 9,610,737 B2 | 4/2017 | Johnson et al. | |
| 9,611,667 B2 | 4/2017 | GangaRao et al. | |
| 9,616,623 B2 | 4/2017 | Johnson et al. | |
| 9,626,487 B2 | 4/2017 | Jung et al. | |
| 9,626,489 B2 | 4/2017 | Nilsson | |
| 9,643,361 B2 | 5/2017 | Liu | |
| 9,662,840 B1 | 5/2017 | Buller et al. | |
| 9,665,182 B2 | 5/2017 | Send et al. | |
| 9,672,389 B1 | 6/2017 | Mosterman et al. | |
| 9,672,550 B2 | 6/2017 | Apsley et al. | |
| 9,676,145 B2 | 6/2017 | Buller et al. | |
| 9,684,919 B2 | 6/2017 | Apsley et al. | |
| 9,688,032 B2 | 6/2017 | Kia et al. | |
| 9,690,286 B2 | 6/2017 | Hovsepian et al. | |
| 9,700,966 B2 | 7/2017 | Kraft et al. | |
| 9,703,896 B2 | 7/2017 | Zhang et al. | |
| 9,713,903 B2 | 7/2017 | Paschkewitz et al. | |
| 9,718,302 B2 | 8/2017 | Young et al. | |
| 9,718,434 B2 | 8/2017 | Hector, Jr. et al. | |
| 9,724,877 B2 | 8/2017 | Flitsch et al. | |

(56) References Cited

U.S. PATENT DOCUMENTS

| | | |
|---|---|---|
| 9,724,881 B2 | 8/2017 | Johnson et al. |
| 9,725,178 B2 | 8/2017 | Wang |
| 9,731,730 B2 | 8/2017 | Stiles |
| 9,731,773 B2 | 8/2017 | Gami et al. |
| 9,741,954 B2 | 8/2017 | Bruder et al. |
| 9,747,352 B2 | 8/2017 | Karmarkar |
| 9,764,415 B2 | 9/2017 | Seufzer et al. |
| 9,764,520 B2 | 9/2017 | Johnson et al. |
| 9,765,226 B2 | 9/2017 | Dain |
| 9,770,760 B2 | 9/2017 | Liu |
| 9,773,393 B2 | 9/2017 | Velez |
| 9,776,234 B2 | 10/2017 | Schaafhausen et al. |
| 9,782,936 B2 | 10/2017 | Glunz et al. |
| 9,783,324 B2 | 10/2017 | Embler et al. |
| 9,783,977 B2 | 10/2017 | Alqasimi et al. |
| 9,789,548 B2 | 10/2017 | Golshany et al. |
| 9,789,922 B2 | 10/2017 | Dosenbach et al. |
| 9,796,137 B2 | 10/2017 | Zhang et al. |
| 9,802,108 B2 | 10/2017 | Aders |
| 9,809,977 B2 | 11/2017 | Carney et al. |
| 9,815,514 B2 * | 11/2017 | Van Steenwyk ....... B60G 3/185 |
| 9,817,922 B2 | 11/2017 | Glunz et al. |
| 9,818,071 B2 | 11/2017 | Jung et al. |
| 9,821,339 B2 | 11/2017 | Paschkewitz et al. |
| 9,821,411 B2 | 11/2017 | Buller et al. |
| 9,823,143 B2 | 11/2017 | Twelves, Jr. et al. |
| 9,829,564 B2 | 11/2017 | Bruder et al. |
| 9,846,933 B2 | 12/2017 | Yuksel |
| 9,854,828 B2 | 1/2018 | Langeland |
| 9,858,604 B2 | 1/2018 | Apsley et al. |
| 9,862,833 B2 | 1/2018 | Hasegawa et al. |
| 9,862,834 B2 | 1/2018 | Hasegawa et al. |
| 9,863,885 B2 | 1/2018 | Zaretski et al. |
| 9,870,629 B2 | 1/2018 | Cardno et al. |
| 9,879,981 B1 | 1/2018 | Dehghan Niri et al. |
| 9,884,663 B2 | 2/2018 | Czinger et al. |
| 9,898,776 B2 | 2/2018 | Apsley et al. |
| 9,914,150 B2 | 3/2018 | Pettersson et al. |
| 9,919,360 B2 | 3/2018 | Buller et al. |
| 9,931,697 B2 | 4/2018 | Levin et al. |
| 9,933,031 B2 | 4/2018 | Bracamonte et al. |
| 9,933,092 B2 | 4/2018 | Sindelar |
| 9,957,031 B2 | 5/2018 | Golshany et al. |
| 9,958,535 B2 | 5/2018 | Send et al. |
| 9,962,767 B2 | 5/2018 | Buller et al. |
| 9,963,978 B2 | 5/2018 | Johnson et al. |
| 9,971,920 B2 | 5/2018 | Derakhshani et al. |
| 9,976,063 B2 | 5/2018 | Childers et al. |
| 9,987,792 B2 | 6/2018 | Flitsch et al. |
| 9,988,136 B2 | 6/2018 | Tiryaki et al. |
| 9,989,623 B2 | 6/2018 | Send et al. |
| 9,990,565 B2 | 6/2018 | Rhoads et al. |
| 9,994,339 B2 | 6/2018 | Colson et al. |
| 9,996,890 B1 | 6/2018 | Cinnamon et al. |
| 9,996,945 B1 | 6/2018 | Holzer et al. |
| 10,002,215 B2 | 6/2018 | Dowski et al. |
| 10,006,156 B2 | 6/2018 | Kirkpatrick |
| 10,011,089 B2 | 7/2018 | Lyons et al. |
| 10,011,685 B2 | 7/2018 | Childers et al. |
| 10,012,532 B2 | 7/2018 | Send et al. |
| 10,013,777 B2 | 7/2018 | Mariampillai et al. |
| 10,015,908 B2 | 7/2018 | Williams et al. |
| 10,016,852 B2 | 7/2018 | Broda |
| 10,016,942 B2 | 7/2018 | Mark et al. |
| 10,017,384 B1 | 7/2018 | Greer et al. |
| 10,018,576 B2 | 7/2018 | Herbsommer et al. |
| 10,022,792 B2 | 7/2018 | Srivas et al. |
| 10,022,912 B2 | 7/2018 | Kia et al. |
| 10,027,376 B2 | 7/2018 | Sankaran et al. |
| 10,029,415 B2 | 7/2018 | Swanson et al. |
| 10,040,239 B2 | 8/2018 | Brown, Jr. |
| 10,046,412 B2 | 8/2018 | Blackmore |
| 10,048,769 B2 | 8/2018 | Selker et al. |
| 10,052,712 B2 | 8/2018 | Blackmore |
| 10,052,820 B2 | 8/2018 | Kemmer et al. |
| 10,055,536 B2 | 8/2018 | Maes et al. |
| 10,058,764 B2 | 8/2018 | Aders |
| 10,058,920 B2 | 8/2018 | Buller et al. |
| 10,061,906 B2 | 8/2018 | Nilsson |
| 10,065,270 B2 | 9/2018 | Buller et al. |
| 10,065,361 B2 | 9/2018 | Susnjara et al. |
| 10,065,367 B2 | 9/2018 | Brown, Jr. |
| 10,068,316 B1 | 9/2018 | Holzer et al. |
| 10,071,422 B2 | 9/2018 | Buller et al. |
| 10,071,525 B2 | 9/2018 | Susnjara et al. |
| 10,072,179 B2 | 9/2018 | Drijfhout |
| 10,074,128 B2 | 9/2018 | Colson et al. |
| 10,076,875 B2 | 9/2018 | Mark et al. |
| 10,076,876 B2 | 9/2018 | Mark et al. |
| 10,081,140 B2 | 9/2018 | Paesano et al. |
| 10,081,431 B2 | 9/2018 | Seack et al. |
| 10,086,568 B2 | 10/2018 | Snyder et al. |
| 10,087,320 B2 | 10/2018 | Simmons et al. |
| 10,087,556 B2 | 10/2018 | Gallucci et al. |
| 10,099,427 B2 | 10/2018 | Mark et al. |
| 10,100,542 B2 | 10/2018 | GangaRao et al. |
| 10,100,890 B2 | 10/2018 | Bracamonte et al. |
| 10,107,344 B2 | 10/2018 | Bracamonte et al. |
| 10,108,766 B2 | 10/2018 | Druckman et al. |
| 10,113,600 B2 | 10/2018 | Bracamonte et al. |
| 10,118,347 B2 | 11/2018 | Stauffer et al. |
| 10,118,579 B2 | 11/2018 | Lakic |
| 10,120,078 B2 | 11/2018 | Bruder et al. |
| 10,124,546 B2 | 11/2018 | Johnson et al. |
| 10,124,570 B2 | 11/2018 | Evans et al. |
| 10,137,500 B2 | 11/2018 | Blackmore |
| 10,138,354 B2 | 11/2018 | Groos et al. |
| 10,144,126 B2 | 12/2018 | Krohne et al. |
| 10,145,110 B2 | 12/2018 | Carney et al. |
| 10,151,363 B2 | 12/2018 | Bracamonte et al. |
| 10,152,661 B2 | 12/2018 | Kieser |
| 10,160,278 B2 | 12/2018 | Coombs et al. |
| 10,161,021 B2 | 12/2018 | Lin et al. |
| 10,166,752 B2 | 1/2019 | Evans et al. |
| 10,166,753 B2 | 1/2019 | Evans et al. |
| 10,171,578 B1 | 1/2019 | Cook et al. |
| 10,173,255 B2 | 1/2019 | TenHouten et al. |
| 10,173,327 B2 | 1/2019 | Kraft et al. |
| 10,178,800 B2 | 1/2019 | Mahalingam et al. |
| 10,179,640 B2 | 1/2019 | Wilkerson |
| 10,183,330 B2 | 1/2019 | Buller et al. |
| 10,183,478 B2 | 1/2019 | Evans et al. |
| 10,189,187 B2 | 1/2019 | Keating et al. |
| 10,189,240 B2 | 1/2019 | Evans et al. |
| 10,189,241 B2 | 1/2019 | Evans et al. |
| 10,189,242 B2 | 1/2019 | Evans et al. |
| 10,190,424 B2 | 1/2019 | Johnson et al. |
| 10,195,693 B2 | 2/2019 | Buller et al. |
| 10,196,539 B2 | 2/2019 | Boonen et al. |
| 10,197,338 B2 | 2/2019 | Melsheimer |
| 10,200,677 B2 | 2/2019 | Trevor et al. |
| 10,201,932 B2 | 2/2019 | Flitsch et al. |
| 10,201,941 B2 | 2/2019 | Evans et al. |
| 10,202,673 B2 | 2/2019 | Lin et al. |
| 10,204,216 B2 | 2/2019 | Nejati et al. |
| 10,207,454 B2 | 2/2019 | Buller et al. |
| 10,209,065 B2 | 2/2019 | Estevo, Jr. et al. |
| 10,210,662 B2 | 2/2019 | Holzer et al. |
| 10,213,837 B2 | 2/2019 | Kondoh |
| 10,214,248 B2 | 2/2019 | Hall et al. |
| 10,214,252 B2 | 2/2019 | Schellekens et al. |
| 10,214,275 B2 | 2/2019 | Goehlich |
| 10,220,575 B2 | 3/2019 | Reznar |
| 10,220,881 B2 | 3/2019 | Tyan et al. |
| 10,221,530 B2 | 3/2019 | Driskell et al. |
| 10,226,900 B1 | 3/2019 | Nevins |
| 10,232,550 B2 | 3/2019 | Evans et al. |
| 10,234,342 B2 | 3/2019 | Moorlag et al. |
| 10,237,477 B2 | 3/2019 | Trevor et al. |
| 10,252,335 B2 | 4/2019 | Buller et al. |
| 10,252,336 B2 | 4/2019 | Buller et al. |
| 10,254,499 B1 | 4/2019 | Cohen et al. |
| 10,257,499 B2 | 4/2019 | Hintz et al. |
| 10,259,044 B2 | 4/2019 | Buller et al. |

(56) References Cited

U.S. PATENT DOCUMENTS

| | | | |
|---|---|---|---|
| 10,268,181 B1 | 4/2019 | Nevins | |
| 10,269,225 B2 | 4/2019 | Velez | |
| 10,272,860 B2 | 4/2019 | Mohapatra et al. | |
| 10,272,862 B2 | 4/2019 | Whitehead | |
| 10,275,564 B2 | 4/2019 | Ridgeway et al. | |
| 10,279,580 B2 | 5/2019 | Evans et al. | |
| 10,285,219 B2 | 5/2019 | Fetfatsidis et al. | |
| 10,286,452 B2 | 5/2019 | Buller et al. | |
| 10,286,603 B2 | 5/2019 | Buller et al. | |
| 10,286,961 B2 | 5/2019 | Hillebrecht et al. | |
| 10,289,263 B2 | 5/2019 | Troy et al. | |
| 10,289,875 B2 | 5/2019 | Singh et al. | |
| 10,291,193 B2 | 5/2019 | Dandu et al. | |
| 10,294,552 B2 | 5/2019 | Liu et al. | |
| 10,294,982 B2 | 5/2019 | Gabrys et al. | |
| 10,295,989 B1 | 5/2019 | Nevins | |
| 10,303,159 B2 | 5/2019 | Czinger et al. | |
| 10,307,824 B2 | 6/2019 | Kondoh | |
| 10,310,197 B1 | 6/2019 | Droz et al. | |
| 10,313,651 B2 | 6/2019 | Trevor et al. | |
| 10,315,252 B2 | 6/2019 | Mendelsberg et al. | |
| 10,336,050 B2 | 7/2019 | Susnjara | |
| 10,337,542 B2 | 7/2019 | Hesslewood et al. | |
| 10,337,952 B2 | 7/2019 | Bosetti et al. | |
| 10,339,266 B2 | 7/2019 | Urick et al. | |
| 10,343,330 B2 | 7/2019 | Evans et al. | |
| 10,343,331 B2 | 7/2019 | McCall et al. | |
| 10,343,355 B2 | 7/2019 | Evans et al. | |
| 10,343,724 B2 | 7/2019 | Polewarczyk et al. | |
| 10,343,725 B2 | 7/2019 | Martin et al. | |
| 10,350,823 B2 | 7/2019 | Rolland et al. | |
| 10,356,341 B2 | 7/2019 | Holzer et al. | |
| 10,356,395 B2 | 7/2019 | Holzer et al. | |
| 10,357,829 B2 | 7/2019 | Spink et al. | |
| 10,357,957 B2 | 7/2019 | Buller et al. | |
| 10,359,756 B2 | 7/2019 | Newell et al. | |
| 10,369,629 B2 | 8/2019 | Mendelsberg et al. | |
| 10,382,739 B1 | 8/2019 | Rusu et al. | |
| 10,384,393 B2 | 8/2019 | Xu et al. | |
| 10,384,416 B2 | 8/2019 | Cheung et al. | |
| 10,389,410 B2 | 8/2019 | Brooks et al. | |
| 10,391,710 B2 | 8/2019 | Mondesir | |
| 10,392,097 B2 | 8/2019 | Pham et al. | |
| 10,392,131 B2 | 8/2019 | Deck et al. | |
| 10,393,315 B2 | 8/2019 | Tyan | |
| 10,400,080 B2 | 9/2019 | Ramakrishnan et al. | |
| 10,401,832 B2 | 9/2019 | Snyder et al. | |
| 10,403,009 B2 | 9/2019 | Mariampillai et al. | |
| 10,406,750 B2 | 9/2019 | Barton et al. | |
| 10,412,283 B2 | 9/2019 | Send et al. | |
| 10,416,095 B2 | 9/2019 | Herbsommer et al. | |
| 10,421,496 B2 | 9/2019 | Swayne et al. | |
| 10,421,863 B2 | 9/2019 | Hasegawa et al. | |
| 10,422,478 B2 | 9/2019 | Leachman et al. | |
| 10,425,793 B2 | 9/2019 | Sankaran et al. | |
| 10,427,364 B2 | 10/2019 | Alves | |
| 10,429,006 B2 | 10/2019 | Tyan et al. | |
| 10,434,573 B2 | 10/2019 | Buller et al. | |
| 10,435,185 B2 | 10/2019 | Divine et al. | |
| 10,435,773 B2 | 10/2019 | Liu et al. | |
| 10,436,038 B2 | 10/2019 | Buhler et al. | |
| 10,438,407 B2 | 10/2019 | Pavanaskar et al. | |
| 10,440,351 B2 | 10/2019 | Holzer et al. | |
| 10,442,002 B2 | 10/2019 | Benthien et al. | |
| 10,442,003 B2 | 10/2019 | Symeonidis et al. | |
| 10,449,696 B2 | 10/2019 | Elgar et al. | |
| 10,449,737 B2 | 10/2019 | Johnson et al. | |
| 10,461,810 B2 | 10/2019 | Cook et al. | |
| 2003/0075881 A1* | 4/2003 | Delorenzis | B60G 17/0432 280/5.5 |
| 2003/0075882 A1* | 4/2003 | Delorenzis | B60G 17/0164 280/5.508 |
| 2004/0154887 A1* | 8/2004 | Nehl | B60G 17/01933 188/266.2 |
| 2006/0108783 A1 | 5/2006 | Ni et al. | |
| 2007/0045024 A1* | 3/2007 | Koistra | B62K 25/283 180/227 |
| 2007/0209872 A1* | 9/2007 | Bjorklund | E04G 3/30 182/142 |
| 2012/0046829 A1* | 2/2012 | Ogawa | B60G 17/08 701/37 |
| 2014/0277669 A1 | 9/2014 | Nardi et al. | |
| 2015/0075943 A1* | 3/2015 | Williams | F16D 3/12 192/41 S |
| 2015/0102575 A1 | 4/2015 | Lake et al. | |
| 2015/0224845 A1* | 8/2015 | Anderson | B60G 17/052 701/37 |
| 2017/0113344 A1 | 4/2017 | Schönberg | |
| 2017/0341309 A1 | 11/2017 | Piepenbrock et al. | |
| 2018/0141543 A1* | 5/2018 | Krosschell | B60W 10/184 |
| 2018/0179867 A1* | 6/2018 | Artinian | F04D 25/0686 |
| 2018/0265155 A1* | 9/2018 | Raffaelli | B62L 1/00 |

FOREIGN PATENT DOCUMENTS

| | | | |
|---|---|---|---|
| EP | 2540533 B1 | 8/2017 | |
| GB | 201407619-D0 | * 6/2014 | ............ B60G 11/04 |
| WO | 1996036455 A1 | 11/1996 | |
| WO | 1996036525 A1 | 11/1996 | |
| WO | 1996038260 A1 | 12/1996 | |
| WO | 2003024641 A1 | 3/2003 | |
| WO | 2004108343 A1 | 12/2004 | |
| WO | 2005093773 A1 | 10/2005 | |
| WO | 2007003375 A1 | 1/2007 | |
| WO | 2007110235 A1 | 10/2007 | |
| WO | 2007110236 A1 | 10/2007 | |
| WO | 2008019847 A1 | 2/2008 | |
| WO | 2007128586 A3 | 6/2008 | |
| WO | 2008068314 A2 | 6/2008 | |
| WO | 2008086994 A1 | 7/2008 | |
| WO | 2008087024 A1 | 7/2008 | |
| WO | 2008107130 A1 | 9/2008 | |
| WO | 2008138503 A1 | 11/2008 | |
| WO | 2008145396 A1 | 12/2008 | |
| WO | 2009083609 A2 | 7/2009 | |
| WO | 2009098285 A1 | 8/2009 | |
| WO | 2009112520 A1 | 9/2009 | |
| WO | 2009135938 A1 | 11/2009 | |
| WO | 2009140977 A1 | 11/2009 | |
| WO | 2010125057 A2 | 11/2010 | |
| WO | 2010125058 A1 | 11/2010 | |
| WO | 2010142703 A2 | 12/2010 | |
| WO | 2011032533 A1 | 3/2011 | |
| WO | 2014016437 A1 | 1/2014 | |
| WO | 2014187720 A1 | 11/2014 | |
| WO | 2014195340 A1 | 12/2014 | |
| WO | 2015193331 A1 | 12/2015 | |
| WO | 2016116414 A1 | 7/2016 | |
| WO | 2017036461 A1 | 3/2017 | |
| WO | 2019030248 A1 | 2/2019 | |
| WO | 2019042504 A1 | 3/2019 | |
| WO | 2019048010 A1 | 3/2019 | |
| WO | 2019048498 A1 | 3/2019 | |
| WO | 2019048680 A1 | 3/2019 | |
| WO | 2019048682 A1 | 3/2019 | |

OTHER PUBLICATIONS

US 9,809,265 B2, 11/2017, Kinjo (withdrawn)
US 10,449,880 B2, 10/2019, Mizobata et al. (withdrawn)
Google translation of Chinese Patent Application Pub No. CN 103434364 A1 to Wanan et al. that published on 12-13 (hereinafter "Wanan").*
Google translation of Canadian Patent No. CA1133795A to Hardin et al.*
NPL, Mike Hanlon (Nov. 19, 2009). "Narrow track vehicles—the convergence of the car and the motorcycle" (https://newatlas.com/nissan-landglider/13368/) (hereinafter "Hanlon").*
NPL, F. Claveau (Oct. 2014). Fabien Claveau, Philippe Chevrel, Lama Mourad. Non-linear control of a Narrow Tilting Vehicle, IEEE International Conference on Systems, Man, and Cybernetics

(56) References Cited

OTHER PUBLICATIONS (SMC), Oct. 2014, San Diego, United States. pp. 2488-2494, 2014, <10.1109/SMC.2014.6974300>. <hal-01105300> (https://hal.ar.*
Nick Lavars: "Peugeot Splits the Difference Between Two and Four Wheels with Tilting PHEV Scooter," New Atlas.com article, published Dec. 6, 2017, website: https://newatlas.com/peugeot-tilting-phev-scooter/52516/.
International Search Report and Written Opinion dated Feb. 21, 2019, regarding PCT/US2018/059627.

* cited by examiner

SUSPENSION SYSTEMS USING HYDRAULIC DAMPERS

BACKGROUND

Field

The present disclosure relates generally to transport structures, and more specifically to versatile suspension systems that use dynamic leaning techniques.

Background

Additive manufacturing (AM) introduces numerous practical advantages and beneficially complements conventional machining in automotive and related industries. Due to AM's continued development and refinement, manufacturers in these industries are understandably eager to incorporate AM into their build strategy. One application that may derive substantial benefits from AM is the use of solar energy to power, in part or in whole, cars, aircraft, boats and other transport structures.

Conventional approaches to developing solar-powered cars have been circumscribed by practical limitations including, for example, the inability to harness adequate amounts of solar energy to power the vehicles given the limited surface area to place panels, the vehicle weight, drag of the vehicle while in motion, and other factors.

Other problems include the need for an adequate suspension system and related components that increase the capability of the solar vehicle and that further act to reduce energy consumption of the vehicle.

SUMMARY

Several aspects of suspension systems used in solar extended range electric vehicles and other transport structures will be described more fully hereinafter with reference to various illustrative aspects of the present disclosure.

In one aspect of the present disclosure, a quadricycle suspension system for a vehicle quadricycle suspension system for a vehicle includes a first damper arranged on a first side of the suspension system and a second damper arranged on a second side of the suspension system, wherein the first damper is coupled to the second damper via at least one interconnect, each at least one interconnect comprising a valve configured to control the motion of the first damper relative to the second damper.

In another aspect of the present disclosure, a quadricycle suspension system for a vehicle includes a first damper coupled respectively to first trailing and leading links, a second damper coupled respectively to second trailing and leading links, a first active valve coupled to first inlet compression and rebound ports of the first damper, and a second active valve coupled to second inlet compression and rebound ports of the second damper, wherein the first and second active valves are configured to damp heave and pitch of the vehicle by controlling relative motion of the first and second dampers based on an at least one input.

Different suspension systems are disclosed that have not previously been developed or proposed. It will be understood that other aspects of suspension systems will become readily apparent to those skilled in the art based on the following detailed description, wherein only several embodiments are described by way of illustration. As will be appreciated by those skilled in the art, these suspension systems can be realized with other embodiments without departing from the spirit and scope of the invention. Accordingly, the drawings and detailed description are to be regarded as illustrative in nature and not as restrictive.

BRIEF DESCRIPTION OF THE DRAWINGS

Various features of quadricycle suspension systems will now be presented in the detailed description by way of example, and not by way of limitation, in the accompanying drawings, wherein.

DETAILED DESCRIPTION

The detailed description set forth below with reference to the appended drawings is intended to provide a description of exemplary embodiments of suspension systems in solar extended range vehicles and other transports. The description is not intended to represent the only embodiments in which the invention may be practiced. The term "exemplary" used throughout this disclosure means "serving as an example, instance, or illustration," and should not necessarily be construed as preferred or advantageous over other embodiments presented in this disclosure. The detailed description includes specific details for providing a thorough and complete disclosure that fully conveys the scope of the invention to those skilled in the art. However, the invention may be practiced without these specific details. In some instances, well-known structures and components may be shown in block diagram form, or omitted entirely, to avoid obscuring the various concepts presented throughout this disclosure.

In one aspect of the present disclosure, a solar extended range electric vehicle is introduced in which a dual-mode suspension system is used. In one embodiment, the suspension system uses at least a pair of hydraulic dampers which can engage via the use of one or more damper valves, including controlling the relative motion of the dampers, when the vehicle is traveling at low speeds Alternatively, when other conditions exist such as when the vehicle passes a predetermined speed or the vehicle has crossed some threshold with respect to some magnitude of requested lateral acceleration, the damper valves may be configured to partially disengage the hydraulic dampers to reduce relative motion limitations. In this manner, the relationship between aspects like heave and roll can be well controlled under different speeds and occupant driving conditions.

In certain embodiments, a sensor system may be coupled to a control circuit, wherein the control circuit may be configured to automatically open and close the associated valve in response to characteristics measured from the sensor system.

Figure 1:
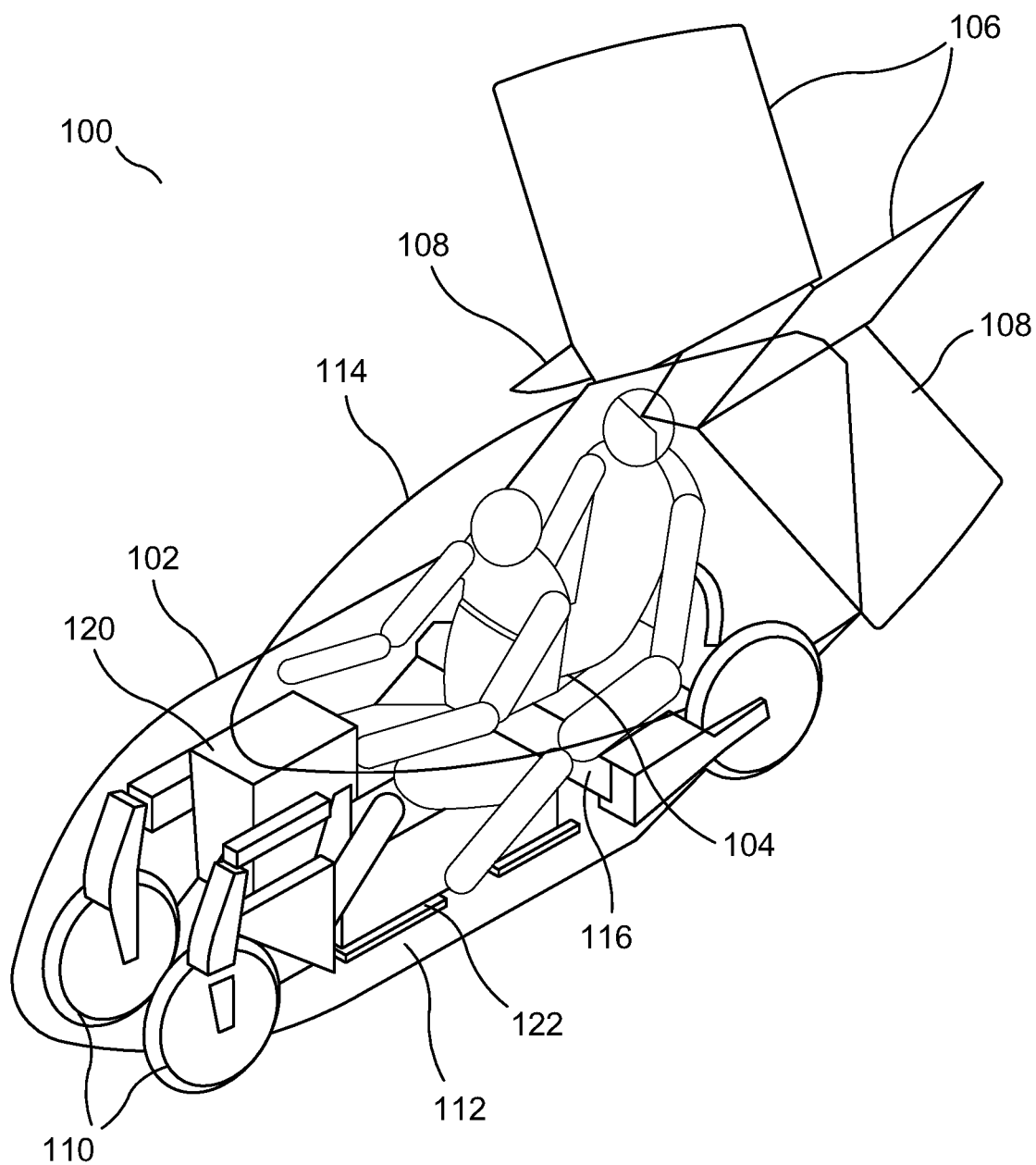
FIG. 1 is a perspective view of a solar extended range electric vehicle.

FIG. 1 is a perspective view of a solar extended range electric vehicle 100. The vehicle 100 may include an aerodynamically contoured frame 102, a transparent or semi-transparent canopy 114, a body structure 112, a suspension system 116 mounted to the body structure 112, center console 120, battery cells 122, and dual inline seating 104 to accommodate two occupants in this embodiment.

In addition, deployable solar panel arrays 106, 108 are attached to the vehicle. In an embodiment, the arrays 106, 108 may be constructed such that when deployed, they are located on either side of the tail. In this embodiment, the deployed arrays cover a total area of approximately three square meters, although the necessary surface area may in practice vary widely depending on numerous factors including characteristics of the vehicle. Arrays 106, 108 can be stowed during motion to the vehicle to improve aerodynamic characteristics. Solar panel arrays 106, 108 may continue to absorb solar energy and may provide sufficient energy for tasks like commuting and when folded or stowed to their original, low drag position as the vehicle moves In some embodiments, two-axis solar tracking can improve array effectiveness by a multiple in the range of approximately 1.3-1.8 or potentially greater.

Figure 2A:
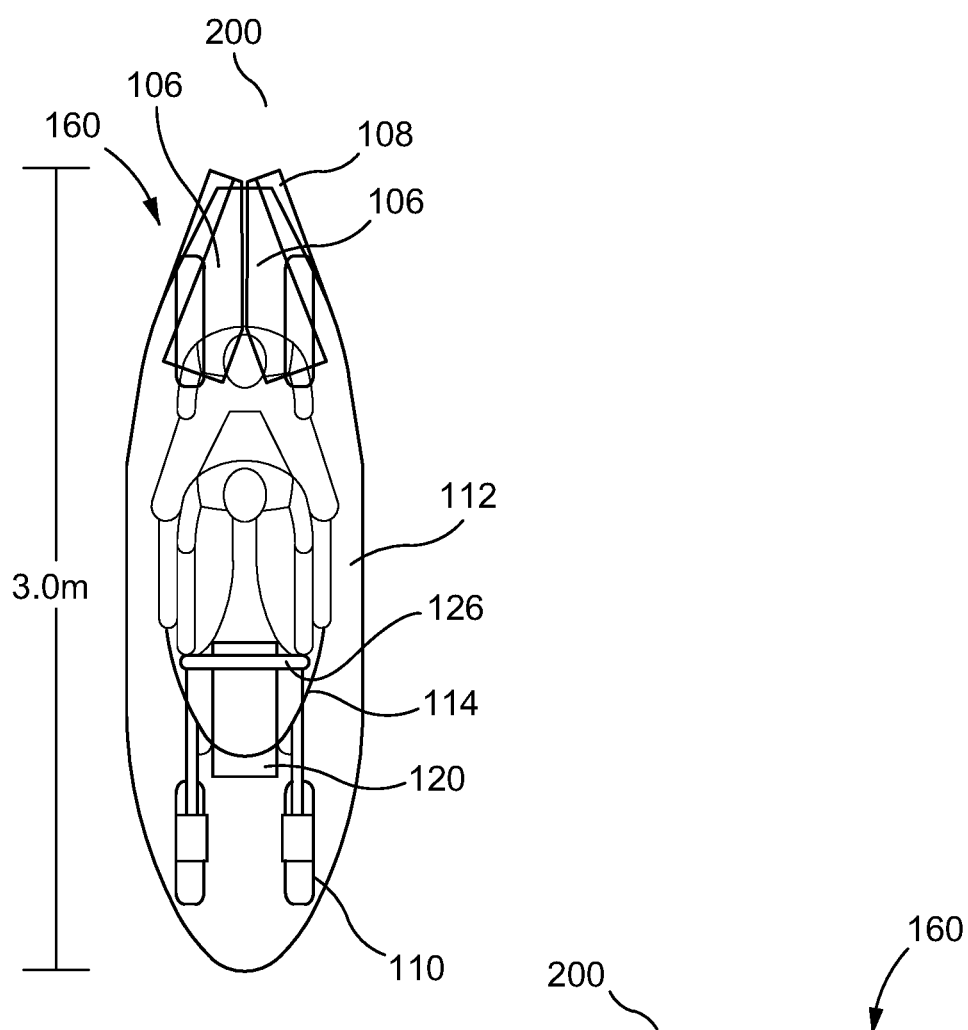
FIG. 2A is a plan view of a solar extended range electric vehicle in mobile mode.
Figure 2B:
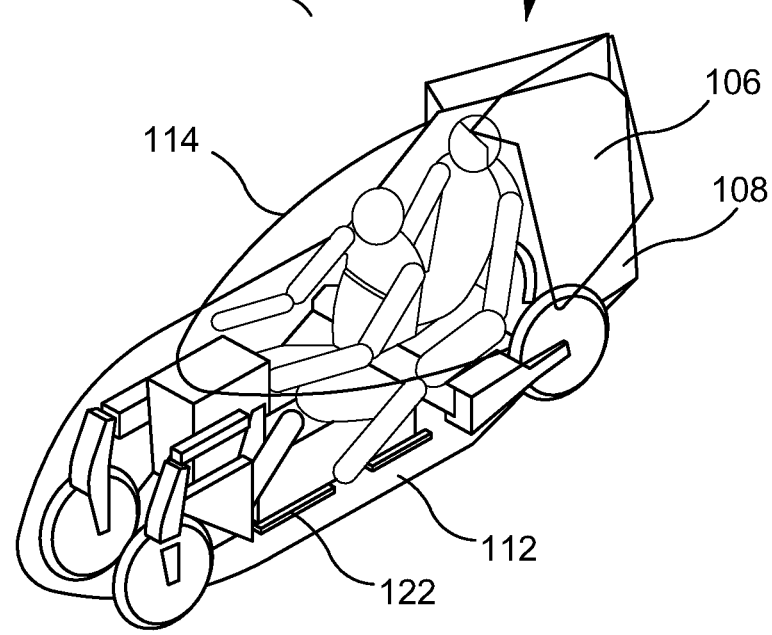
FIG. 2B is a perspective view of the solar extended range electric vehicle in mobile mode.

FIGS. 2A-B are respective plan and perspective views of a solar extended range electric vehicle 200 in mobile mode. As shown in FIGS. 2A-B, the solar panels 106 and 108 are stowable by being foldable substantially flush against tail section 160 of the vehicle 200. Thus, to deactivate the solar panels and prepare for a more aerodynamically efficient mobile mode, lower solar panels 108 may first be folded downward flush along a frame of tail section 160. Thereupon, upper panels 106 may next be folded downward flush along exposed surfaces of upper lower panels 108. In this way, the amount of surface area and hence the drag decreases substantially, and the vehicle 200 is ready to be driven.

FIG. 2A further shows the handlebar 126 steering mechanism as described in greater detail below. FIG. 2B shows a portion of battery pack 122 which may be disposed under the passengers in this example. The front passenger shown in FIG. 2A is adjacent to center console 120, which may include electronics for the various components and in other embodiments, some storage area, or a combination thereof. In certain embodiments, one of nose section or tail section 160 may include modest accommodations for storage (e.g., a few grocery bags). A suspension system 116 (FIG. 1) may be mounted to body structure 112 and coupled to wheel system 110.

Figure 3A:
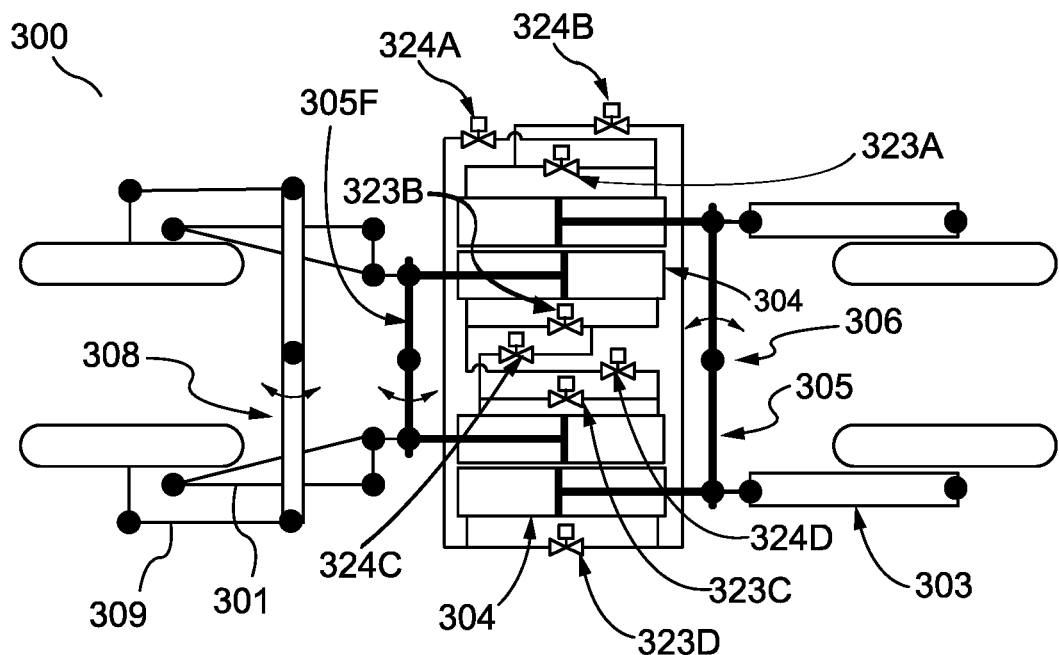
FIG. 3A is a plan view of the suspension and wheel system of the solar extended range electric vehicle.
Figure 3B:
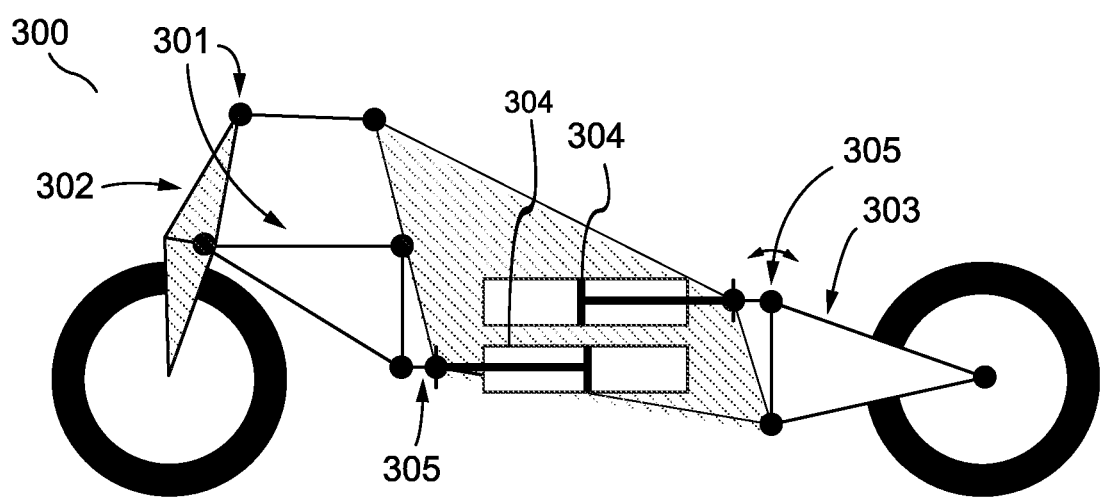
FIG. 3B is an elevation view of the suspension and wheel system of the solar extended range electric vehicle.
Figure 3C:
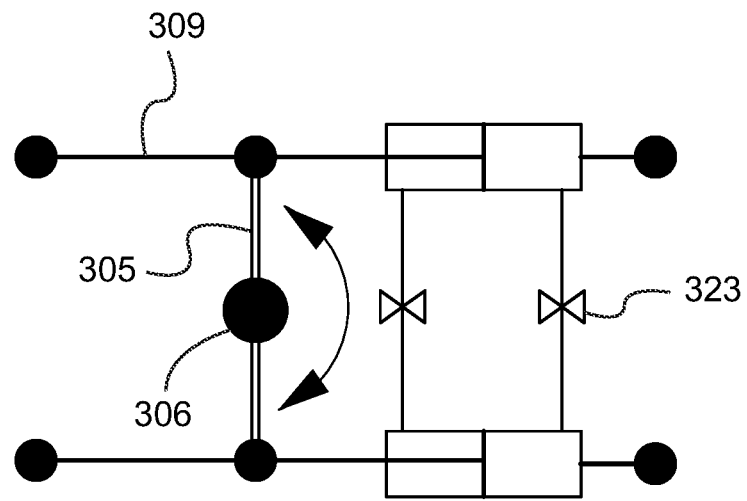
FIG. 3C is a plan view of the suspension system of the solar extended range electric vehicle showing the leaf spring and damper valves.
Figure 3D:
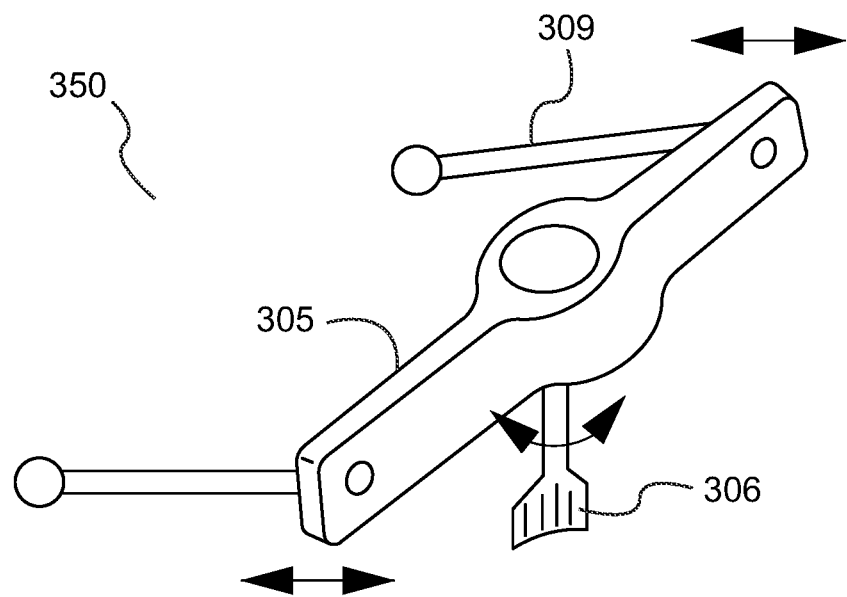
FIG. 3D is a perspective view of the leaf spring of the suspension system.

FIGS. 3A and 3B are respective plan and elevation views of the suspension and wheel system of the solar extended range electric vehicle 300 in accordance with an exemplary embodiment. FIG. 3C is a plan view of the suspension system of the solar extended range electric vehicle showing the leaf spring and damper valves. FIG. 3D is a perspective view of the leaf spring of the suspension system of FIG. 3C. FIG. 3A is exemplary in nature and is not drawn to scale. While FIGS. 3A-D illustrate certain structures for carrying out the inventive concepts herein, it should be understood that these structures are exemplary in nature, and numerous other structures and arrangements may be equally suitable and within the understanding of one skilled in the art upon review of this disclosure.

The wheel system may be coupled to the suspension system via leading links 301 and upright 302 (see FIG. 3B).

The rear wheels may be connected via trailing link 303 for the rear suspension. It should be noted that the trailing link is used for exemplary purposes only, and other and different suspension system components can be equally suitable for purposes of this disclosure. Coupled to trailing links 303 on both sides are dampers 304 for controlling wheel motion. Dampers may be used on each wheel. In certain vehicles, such as a dynamic leaning narrow track vehicle, decoupling of roll and heave may be desired, while in other vehicles such as a non-tilting wide track vehicle, decoupling of heave and warp, and/or roll and warp, may be desired.

Leaf spring 305 associated with the front is coupled with leading links 301 to form the front suspension while leaf spring 305 associated with the rear is coupled with trailing link 303 to form the rear suspension. In this embodiment, dampers 304 each control the motion of one wheel. Center pivots 306 are used with the leaf spring 305 to allow spring rate in heave and none in roll (see also FIG. 3D). In an embodiment, steering link 309 couples the wheels to handlebar 308.

Static stability is key for full exposure-controlled, aerodynamic bodywork. In an embodiment, dampers 304 may be hydraulically interconnected on the compression and rebound circuits (separately) with active valve control via valves 323A-D for heave/pitch control and valves 324A-D for roll control (see FIGS. 3A, 3C). Valves 323A-D in the embodiment of FIG. 3A damp heave and pitch. Valves 324A-D in FIG. 3A damp roll. Low speed damping forces are typically much larger than desired for roll control. Roll represents rotational movement about an axis longitudinal to the length of the vehicle. Thus, in an embodiment, the active valves 324A-D are generally kept open to minimize forces resisting roll and modulated at parking lot speeds to allow forces resisting roll. In another embodiment, a torsion centering spring 306 (see FIG. 3A, 3D) is used concentric with leaf spring pivot 305 for self-centering/roll control—decoupled from the heave loads. This passive centering may also be implemented in a depowered operation, such as parking the vehicle 300. In an embodiment, the state of the valves, and hence the mode of the vehicle, may be determined automatedly using a control system that issues commands to circuits associated with the valves based, for example, on the mode of the vehicle including speed, lateral acceleration, perceived road conditions, and any other number of factors that may cause a desire for an particular operation of the vehicle.

Hydraulic interconnect lockout may also provide a mechanism for simplifying controls for autonomous vehicle operation. A double acting hydraulic cylinder with an orifice between the compression and rebound side of the piston allows damping by restricting flow. If the valve has an actively variable area, it results in hydraulic lockout as well as variable damping force. Cross-vehicle hydraulic connectors between the laterally opposite compression and rebound circuits can completely decouple heave from roll. The hydraulic cylinders can be connected cross-vehicle to allow variable roll resistance via active valving of valves 324A-D in the above embodiment. For low dynamic performance operation (i.e. lower speeds and with proscribed maximum cornering speeds), the roll-control interconnect can be locked out (i.e., no hydraulic fluid communication) such that the autonomous controller does not have to handle the extra degree of freedom related to dynamic leaning. In this fashion, the vehicle is a very conventional four-wheel passenger vehicle from a controls perspective, albeit with lower ultimate cornering performance. With a skilled driver, the interlocks can be put into active mode (open for low roll resistance) for much higher dynamic performance thresholds.

In addition to the active valves, hydraulic motors can be used to move fluids across the vehicle to induce lean or to actively roll the vehicle.

As noted above, static stability is important for full-exposure controlled, aerodynamic bodywork. Stability issues are governed by the suspension system. In addition, dynamic leaning may be used in some embodiments to enable the solar panel canopy to track the emitter. Dynamic emitting may in some embodiments be performed in conjunction with a processing system that uses a GPS or other means for emitter tracking. The processing system may be embodied in a deployment motor or, in some embodiments, as part of an independent component.

Figure 4:
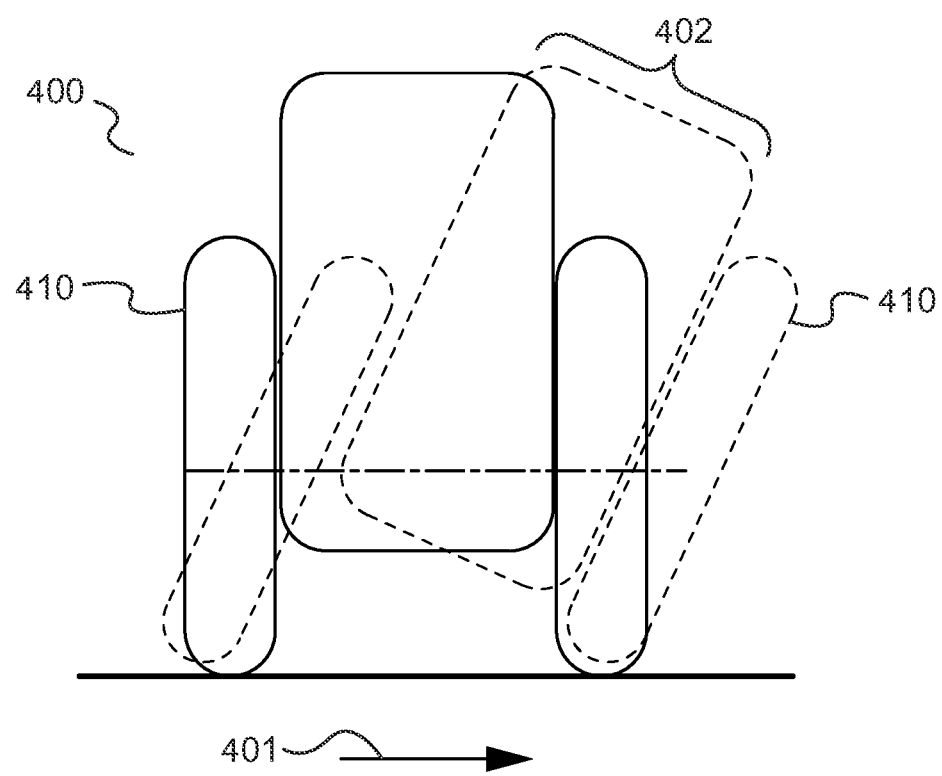
FIG. 4 is an elevation view of the solar extended range electric vehicle in the dynamic leaning narrow track mode.

FIG. 4 is an elevation view of the solar extended range electric vehicle 400 in the dynamic leaning narrow track mode. Reference 402 depicts the dynamic leaning of the vehicle and wheel system 410. The arrow 401 represents the direction of leaning over time.

Figure 5:
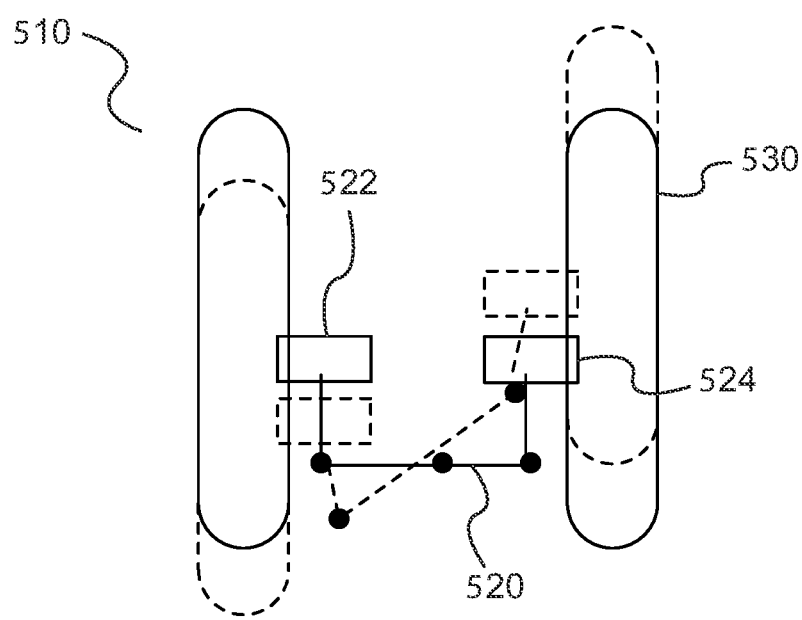
FIG. 5 is an elevation view of the solar extended range electric vehicle in the non-tilting wide track mode.

FIG. 5 is an elevation view of the solar extended range electric vehicle 510 in the non-tilting wide track mode. Vehicle 510 includes leaf spring 520, trailing link 522, hydraulic damper 524 and wheel system 530. The dashed lines indicate the movement of leaf spring 520, trailing link 522 and damper 524 over time.

Table 1, below, illustrates the various exemplary characteristics of warp, roll, heave and pitch as a function of the mode.

TABLE 1

Directional Characteristics and Suspension Mode

| MODE | DYNAMIC LEANING NARROW TRACK | NON-TILTING WIDE TRACK |
| --- | --- | --- |
| Warp | Soft for single wheel bump absorption | Soft for single wheel bump absorption |
| Roll | Very Soft for fastest time to desired lean angle | Stiff for best tire camber control |
| Heave | Driven by desired ride rate | Driven by desired ride rate |
| Pitch | Stiff for attitude control or desired ride rate | Stiff for attitude control or desired ride rate |

The previous description is provided to enable any person skilled in the art to practice the various aspects described herein. Various modifications to the exemplary embodiments presented throughout this disclosure will be clear to those skilled in the art, and the concepts disclosed herein may be applied to other solar vehicles and techniques for panel deployment and emitter tracking in solar vehicles. Thus, the claims are not intended to be limited to the exemplary embodiments presented throughout the disclosure, but are to be accorded the full scope consistent with the language claims. All structural and functional equivalents to the elements of the exemplary embodiments described throughout this disclosure that are known or later come to be known to those of ordinary skill in the art are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f), or analogous law in applicable jurisdictions, unless the element is expressly recited using the phrase "means for" or, in the case of a method claim, the element is recited using the phrase "step for."

What is claimed is:

1. A quadricycle suspension system for a vehicle, comprising:
   a first damper arranged on a first side of the suspension system;
   a second damper arranged on a second side of the suspension system;
   a first valve coupling the first damper to the second damper and configured to control the motion of the first damper relative to the second damper, wherein the first damper is further coupled to the second damper via a first leaf spring, and the first leaf spring is coupled between one of leading links or trailing links respectively located on third and fourth sides of the suspension system;
   a third damper arranged on the first side; and
   a fourth damper arranged on the second side, wherein the third damper is coupled to the fourth damper via a second leaf spring and at least one second valve configured to control the motion of the third damper relative to the fourth damper, and the second leaf spring is coupled between the trailing links, and
   wherein the first and second dampers are coupled to the leading links, and the third and fourth dampers are coupled to the trailing links.

2. The suspension system of claim 1, wherein the first valve is further configured to at least partially disengage the first and second dampers in response to control system commands.

3. The suspension system of claim 2, wherein the control system commands comprise at least one of vehicle speed and vehicle lateral acceleration.

4. The suspension system of claim 1, wherein the second valve is further configured to at least partially disengage the third and fourth dampers in response to control system commands.

5. The suspension system of claim 4, wherein the control system commands comprise at least one of vehicle speed and vehicle lateral acceleration.

6. The suspension system of claim 1, wherein the first leaf spring further comprises a torsion centering spring arranged concentric with a pivot of the first leaf spring, the torsion centering spring configured to decouple heave loads from roll loads.

7. The suspension system of claim 1, wherein at least one of the leading links or the trailing links comprise a girder suspension.

8. The suspension system of claim 1, wherein the first and second dampers comprise double-acting hydraulic cylinders performing compression and rebound connection functions.

9. The suspension system of claim 1, wherein the vehicle comprises a dynamic leaning narrow track vehicle.

10. The suspension system of claim 1, wherein the vehicle comprises a non-tilting wide track vehicle.

11. A quadricycle suspension system for a vehicle, comprising:
    a first damper coupled respectively to a first leading link;
    a second damper coupled respectively to a second leading link;
    a first active valve coupled to the first damper;
    a second active valve coupled to the second damper, the first and second active valves configured to damp heave and pitch of the vehicle by controlling relative motion of the first and second dampers based on an at least one input;

a compression port of the first damper further coupled via a third active valve to a rebound port of the second damper;

a rebound port of the first damper further coupled via a fourth active valve to a compression port of the second damper;

the third and fourth active valves configured to damp roll in response to the at least one input;

wherein the first damper is further coupled to the second damper via a leaf spring, the leaf spring is coupled between the first and second leading links, the first leading link is coupled to the first damper and the second leading link is coupled to the second damper, the leaf spring further comprises a torsion centering spring arranged concentric with a pivot of the leaf spring, and the torsion centering spring is configured to enable passive decoupling of heave loads from roll loads;

a third damper adjacent the first damper and coupled to a fourth damper adjacent the second damper; and a plurality of active valves associated, at least in part, with the third damper and the fourth damper, wherein the plurality of active valves are configured to control the associated dampers based on information from a controller.

12. The suspension system of claim 11, further comprising a control system having one or more outputs coupled to the at least one input, the control system configured to provide an output for controlling a state of the first and second active valves.

13. The suspension system of claim 11, further comprising a control system having one or more outputs coupled to the at least one input, the control system configured to provide an output for controlling a state of the third and fourth active valves.

14. The suspension system of claim 11, wherein the third damper is further coupled to the fourth damper via another leaf spring.

15. The suspension system of claim 11, wherein each of the first and second leading links comprise a girder suspension.

16. The suspension system of claim 11, wherein each of the first and second trailing links comprise a girder suspension or a swing arm suspension.

\* \* \* \* \*